(12) United States Patent
Chen et al.

(10) Patent No.: US 10,485,034 B2
(45) Date of Patent: Nov. 19, 2019

(54) METHOD, DEVICE AND SYSTEM FOR ACCESSING WIRELESS NETWORK

(71) Applicant: Xiaomi Inc., Beijing (CN)

(72) Inventors: Hong Chen, Beijing (CN); Deguo Meng, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 441 days.

(21) Appl. No.: 15/247,174

(22) Filed: Aug. 25, 2016

(65) Prior Publication Data

US 2017/0094694 A1   Mar. 30, 2017

(30) Foreign Application Priority Data

Sep. 30, 2015   (CN) .......................... 2015 1 0642554

(51) Int. Cl.
*H04W 76/11* (2018.01)
*H04W 84/12* (2009.01)
*H04L 29/06* (2006.01)
*H04W 12/08* (2009.01)

(52) U.S. Cl.
CPC .......... *H04W 76/11* (2018.02); *H04L 63/083* (2013.01); *H04W 12/08* (2013.01); *H04W 84/12* (2013.01)

(58) Field of Classification Search
CPC ..... H04W 76/11; H04W 12/08; H04W 84/12; H04L 63/083
See application file for complete search history.

(56) References Cited

U.S. PATENT DOCUMENTS

| | | | |
|---|---|---|---|
| 8,621,590 B2 | 12/2013 | Hoggan | |
| 2003/0148763 A1* | 8/2003 | Kikuchi | H04W 4/02 455/433 |
| 2003/0169713 A1 | 9/2003 | Luo | |

(Continued)

FOREIGN PATENT DOCUMENTS

| | | |
|---|---|---|
| CN | 104159219 A | 11/2014 |
| CN | 104469886 A | 3/2015 |
| JP | 2005-109823 A | 4/2005 |

OTHER PUBLICATIONS

International Search Report issued by the State Intellectual Property Office of the People's Republic of China (SIPO) dated Jun. 14, 2016, in counterpart International Application No. PCT/CN2015/099690.

(Continued)

*Primary Examiner* — Wing F Chan
*Assistant Examiner* — Billy H Ng
(74) *Attorney, Agent, or Firm* — Finnegan, Henderson, Farabow, Garrett & Dunner LLP

(57) ABSTRACT

A method for accessing a wireless network includes accessing a target router according to first access information, so as to access a part of one or more servers. The method also includes sending device verification information to the part of one or more servers; and receiving second access information, wherein the second access information is sent by the target router when the device verification information passes a verification performed by the part of one or more servers. The method further includes accessing the target router according to the second access information, so as to access all of the one or more servers.

9 Claims, 18 Drawing Sheets

(56) References Cited

U.S. PATENT DOCUMENTS

| | | | |
|---|---|---|---|
| 2006/0077924 A1* | 4/2006 | Rune | H04L 45/34 370/328 |
| 2007/0178876 A1* | 8/2007 | Yaqub | H04W 76/28 455/343.1 |
| 2013/0166910 A1* | 6/2013 | Wilkinson | H04L 9/0861 713/168 |
| 2013/0217359 A1* | 8/2013 | Cherian | H04W 4/70 455/411 |
| 2015/0072653 A1* | 3/2015 | Fan | H04W 12/08 455/411 |
| 2016/0143028 A1* | 5/2016 | Mancuso | H04L 63/20 370/338 |
| 2017/0310655 A1* | 10/2017 | Sethi | H04L 12/4633 |

OTHER PUBLICATIONS

Extended European Search Report issued by European Patent Office dated Jan. 26, 2017, in counterpart European Application No. 16165624 .4.

Notification of Reasons for Refusal issued by the Japanese Patent Office dated May 16, 2018, in counterpart Japanese Patent Application No. 2017-517050.

* cited by examiner

US 10,485,034 B2

METHOD, DEVICE AND SYSTEM FOR ACCESSING WIRELESS NETWORK

CROSS-REFERENCE TO RELATED APPLICATIONS

This application is based on and claims priority to Chinese Patent Application Serial No. 201510642554.6, filed with the State Intellectual Property Office of P. R. China on Sep. 30, 2015, the entire content of which is incorporated herein by reference.

TECHNICAL FIELD

The present disclosure relates to the field of communication technology, and more particularly, to a method, a device, and a system for accessing a wireless network.

BACKGROUND

In a process of using a smart device, a user may connect the smart device with a router to use a Wireless Fidelity (WIFI) network provided by the router.

When accessing the WIFI network, usually the user manually chooses the WIFI network and inputs a password on the smart device. Alternatively, the user chooses the WIFI network and inputs the password by means of controlling the smart device via other terminals, and then accesses the WIFI network.

The above WIFI network access process requires complex operations. As a result, the user experience is affected.

SUMMARY

In order to solve problems in the related art, the present disclosure provides a method, a device, and a system for accessing a wireless network.

According to a first aspect of the embodiments of the present disclosure, there is provided a method for accessing a wireless network. The method includes accessing a target router according to first access information, so as to access a part of one or more servers. The method also includes sending device verification information to the part of one or more servers; and receiving second access information, wherein the second access information is sent by the target router when the device verification information passes a verification performed by the part of one or more servers. The method further includes accessing the target router according to the second access information, so as to access all of the one or more servers.

According to a second aspect of the embodiments of the present disclosure, there is provided a terminal device. The terminal device includes a processor and a memory for storing instructions executable by the processor. The processor is configured to execute the instructions to access a target router according to first access information, so as to access a part of one or more servers; and send device verification information to the part of one or more servers. The processor is also configured to execute the instructions to receive second access information, wherein the second access information is sent by the target router when the device verification information passes a verification performed by the part of one or more servers. The processor is further configured to execute the instructions to access the target router according to the second access information, so as to access all of the one or more servers.

According to a third aspect of the embodiments of the present disclosure, there is provided a system for accessing a wireless network. The system includes a terminal device, a router, and a server. The terminal device is configured to access the router according to first access information, so as to access a part of the server; and send device verification information to the part of the server. The terminal device is also configured to receive second access information; and access the router according to the second access information, so as to access all of the server. The router is configured to establish a first connection with the terminal device according to the first access information; receive the device verification information sent by the terminal device; send the device verification information to the part of the server; and establish a second connection with the terminal device according to the second access information after the device verification information passes a verification performed by the part of the server. The server is configured to receive the device verification information sent by the terminal device via the router; perform a verification on the terminal device according to the device verification information; and send the second access information to the terminal device via the router when the verification is successful.

It should be understood that, the above general description and following detail description are exemplary and explanatory, and shall not be construed to limit the present disclosure.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementation methods described in the following exemplary embodiments do not represent all the implementation methods consistent with the present disclosure. Instead, they are only examples of the device and method consistent with some aspects of the present disclosure detailed in the appended claims.

Figure 1:
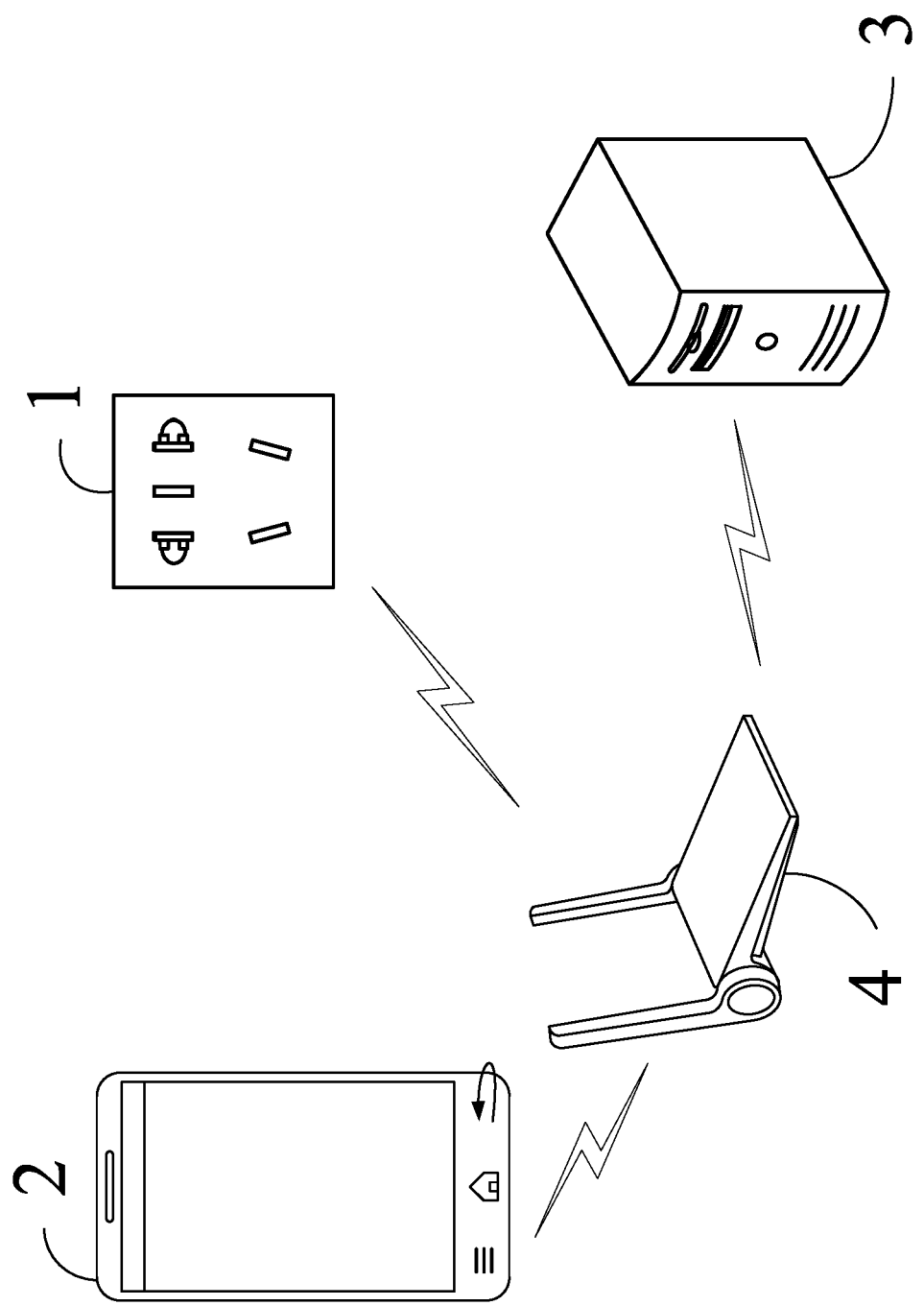
FIG. 1 is a schematic diagram of an application scene according to an exemplary embodiment of the present disclosure.

In order to describe embodiments conveniently, an application scene in accordance with the embodiments of the present disclosure is introduced first. As shown in FIG. 1, the application scene includes a smart device 1, a mobile terminal 2, a server 3, and a router 4. The mobile terminal 2 is connected with the router 3. The mobile terminal 2 is configured to send a start instruction to the router 4, so as to turn on a first wireless network supported by the router 4. The first wireless network does not have a password or the password is a preset password, and communicates with only the server 3. After the first wireless network is turned on, if it is detected by the smart device 1, the smart device 1 accesses the first wireless network, and then performs a verification with the server 3. When the smart device 1 passes the verification, the router 4 sends an identification and a password of a second wireless network to the smart device 1. The smart device 1 accesses the second wireless network after receiving the identification and the password of the second wireless network to upload data and perform other network functions.

The smart device 1 includes, but is not limited to, at least one of a smart plug, a smart camera, a smart watch, a smart bracelet, a smart remote controller, a smart phone etc. The mobile terminal 2 includes, but is not limited to, at least one of a smart phone or a tablet computer. The router 4 is a smart router, e.g., a XiaoMi router.

It should be noted that the above-described types and number of devices are examples, which shall not be construed to limit the present disclosure.

Figure 2:
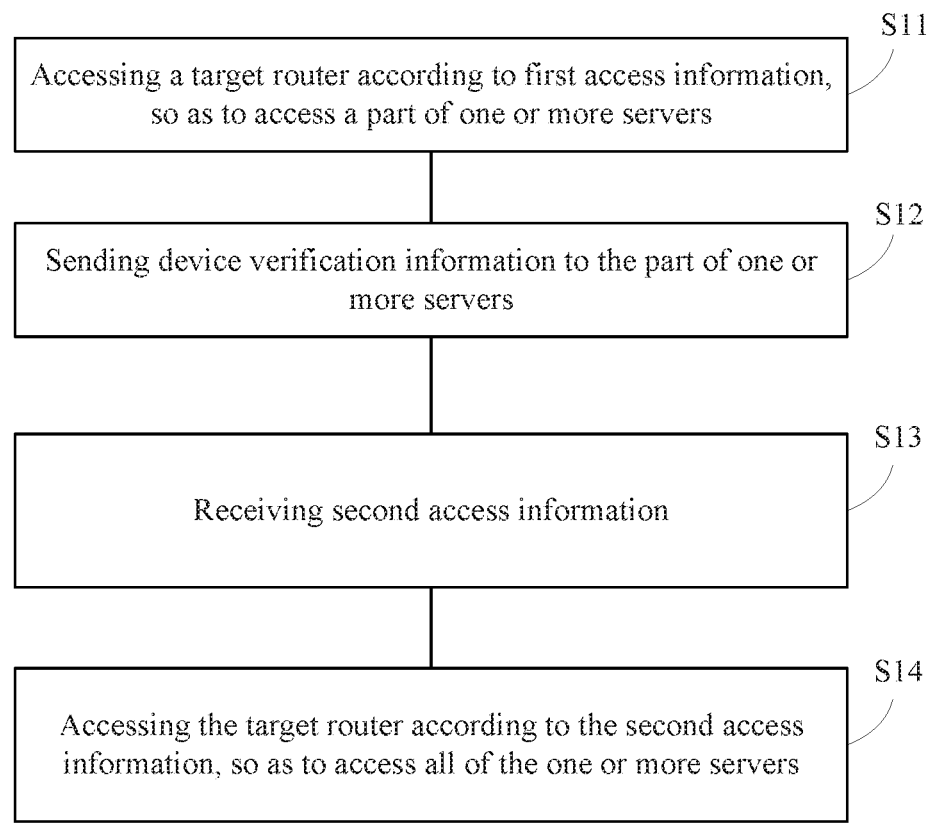
FIG. 2 is a flowchart showing a method for accessing a wireless network according to an exemplary embodiment of the present disclosure.

FIG. 2 is a flowchart showing a method for accessing a wireless network according to an exemplary embodiment of the present disclosure. The method is applied to the smart device described above (e.g., performed by the smart device). As shown in FIG. 2, the method includes the following steps.

In step S11, a target router is accessed according to first access information, so as to access a part of one or more servers.

The part of one or more servers includes a server used for performing a verification on the smart device. The smart device can be a XiaoMi smart plug and/or a XiaoMi bracelet. In some embodiments, the part of one or more servers includes a XiaoMi server.

In step S12, device verification information is sent to the part of one or more servers.

The device verification information is used for verifying the smart device by the part of one or more servers.

In step S13, second access information is received. The second access information is sent by the target router when the device verification information passes the verification performed by the part of one or more servers.

In step S14, the target router is accessed according to the second access information, so as to access all of the one or more servers.

After the target router is accessed according to the second access information, all of the one or more servers in the entire internet can be accessed.

In some embodiments, the target router is the router described above, e.g., a XiaoMi router.

In the present disclosure, the smart device first sends the device verification information to the part of one or more servers for performing the verification via a wireless network that supports accessing only the part of one or more servers. The smart device then obtains the second access information after the verification is successfully performed, such that the target router is accessed according to the second access information, and subsequently, all of the one or more servers are accessed to perform data transmission. When the smart device accesses the target router and all of the one or more servers, the user does not need to manually choose the wireless network and input a password. As a result, the accessing process is convenient, and the user experience is improved.

Figure 3:
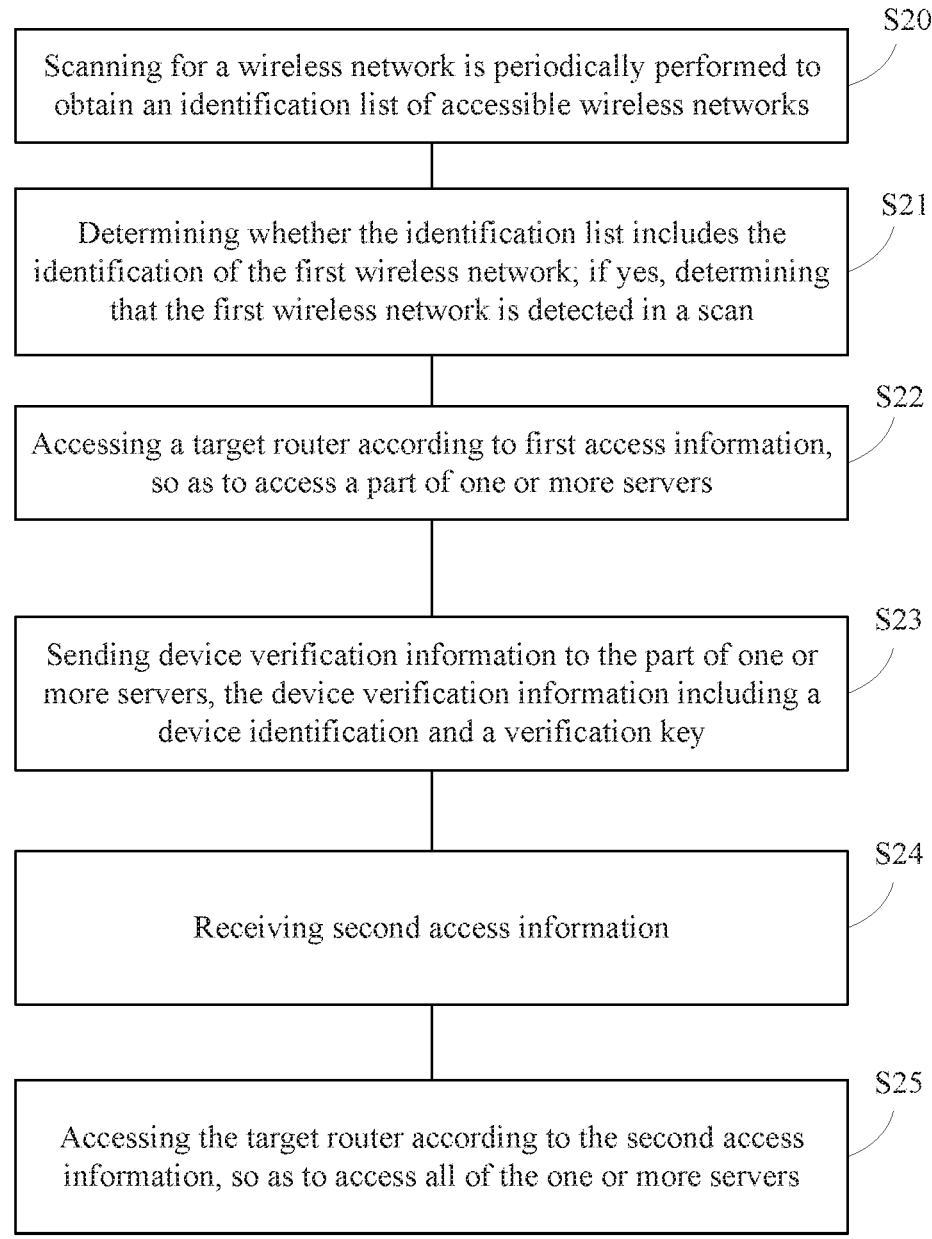
FIG. 3 is a flowchart showing a method for accessing a wireless network according to an exemplary embodiment of the present disclosure.

FIG. 3 is a flowchart showing a method for accessing a wireless network according to an exemplary embodiment of the present disclosure. The method is applied to the smart device described above (e.g., performed by the smart device). As shown in FIG. 3, the method includes the following steps.

In step S20, scanning for a wireless network is periodically performed to obtain an identification list of accessible wireless networks.

For example, the smart device periodically receives beacon frames sent by the routers (e.g., the target router), and determines the identification list of accessible wireless networks according to identifications of the wireless networks in the beacon frames.

The identification of the wireless network is a Service Set Identifier (SSID) of the wireless network, and the identification list of the accessible wireless networks includes multiple SSIDs of the wireless networks.

In step S21, it is determined whether the identification list includes an identification of the first wireless network. If the identification list includes the identification of the first wireless network, it is determined that the first wireless network is detected. The first wireless network is provided by the target router for supporting the smart device in accessing the part of one or more servers. The first wireless network is an unencrypted wireless network or a wireless network with a set password.

If the identification of the first wireless network does not exist in the identification list, step S20 and step S21 are executed until the first wireless network is detected.

In step S22, a target router is accessed according to first access information, so as to enable the smart device to access the part of one or more servers.

The first access information includes the identification of the first wireless network. Alternatively or additionally, the first access information includes the identification and a password of the first wireless network. The first wireless network supports accessing the part of one or more servers. In some embodiments, the first access information is pre-stored in the smart device.

The part of one or more servers includes one or more servers used for performing a verification on the smart device. For example, the smart device can be a XiaoMi smart plug and/or a XiaoMi bracelet. The part of one or more servers includes a XiaoMi server.

In some embodiments of the disclosed method, accessing a target router according to first access information includes sending a verification request to the target router. The verification request includes the identification of the first wireless network, or the identification and the password of the first wireless network. When a verification response returned by the target router is received, the disclosed method also includes associating the smart device with the first wireless network, so as to connect to the first wireless network.

In some embodiments of the disclosed method, associating the smart device with the first wireless network includes sending by the smart device an association request to the target router. The method also includes receiving by the smart device an association confirmation returned by the target router. After the association is completed, the smart device can perform data exchange with the target router.

In step S23, device verification information is sent to the part of one or more servers. The device verification information includes a device identification and a verification key.

The verification key is generated by the server, and programmed into the smart device when the smart device is manufactured. The server stores a correspondence relationship between verification keys and device identifications. The server performs the verification on the smart device according to the stored correspondence relationship between verification keys and device identifications. If the device identification and the verification key sent by the smart device are stored in the server and match with each other, the verification is successful.

In step S24, second access information is received. The second access information is sent by the target router when the device verification information passes the verification performed by the part of one or more servers.

In an embodiment of the present disclosure, receiving second access information includes receiving the second access information sent by the target router. The second access information is sent by the target router according to an instruction from the part of one or more servers. Before sending the second access information to the smart device, the target router receives the instruction from the part of one or more servers. The instruction is used to indicate to the target router that the smart device passes the verification. The instruction includes the device identification of the smart device.

In another embodiment of the present disclosure, receiving second access information includes receiving the second access information sent by the part of one or more servers. The second access information sent by the part of one or more servers can be pre-uploaded to the part of one or more servers by the target router.

If the verification is not successful, the smart device does not receive the second access information.

The second access information includes an identification and a password of a second wireless network. The second wireless network supports accessing all of the one or more servers and the second wireless network is provided by the target router.

In step S25, the target router is accessed according to the second access information, so as to enable the smart device to access all of the one or more servers.

After the target router is accessed according to the second access information, all of the one or more servers in the entire internet can be accessed. In the accessing process, the user does not need to manually choose the wireless network and input a password. Accordingly, the wireless network is accessed without manual work. The disclosed method of accessing the wireless network is especially suitable for a smart device (such as a smart bracelet or a smart plug) that does not include an effective input device or display device. According to the disclosed embodiments, the access is realized without performing a control via other terminal devices, and the accessing process is convenient.

The accessing process is identical to step S22, which is not be repeated herein.

In the present disclosure, the smart device first sends the device verification information to the part of one or more servers for performing the verification via the wireless network that supports accessing only the part of one or more servers. The smart device then obtains the second access information after the verification is successfully performed, such that the target router is accessed according to the second access information, thereby enabling the smart device to access all of the one or more servers to perform data transmission. When the smart device accesses the target router and all of the one or more servers, the user does not need to manually choose the wireless network and input a password. As a result, the accessing process is convenient, and the user experience is improved.

Figure 4:
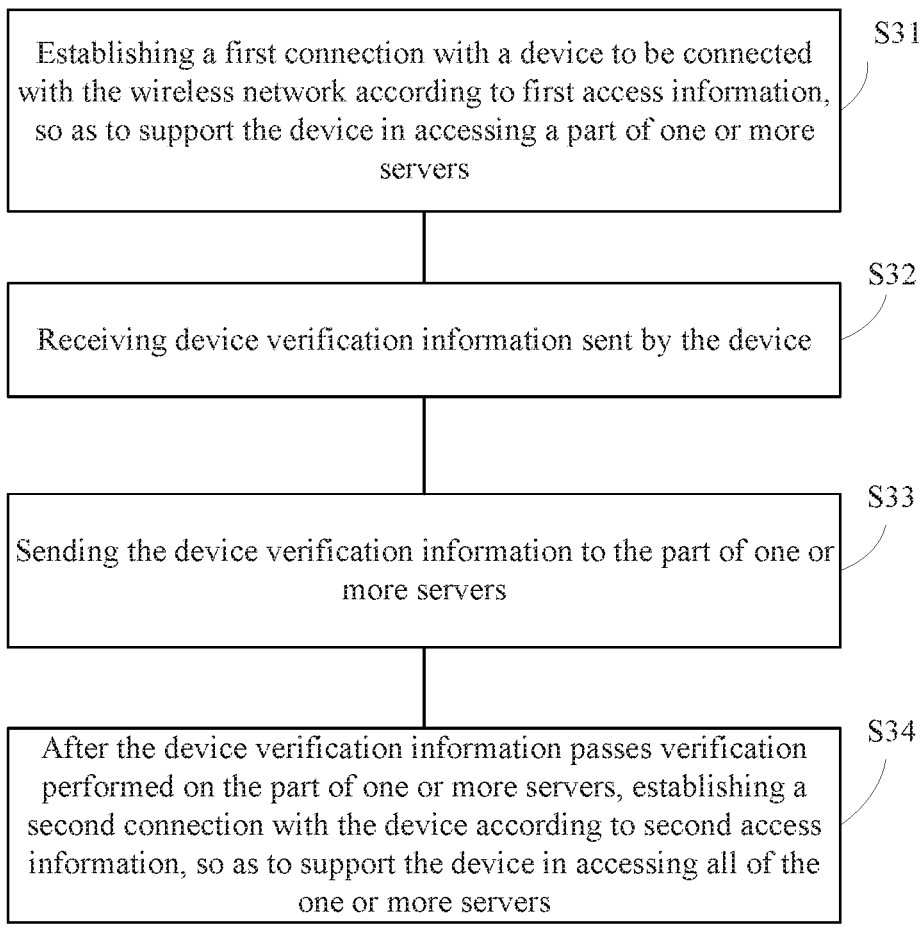
FIG. 4 is a flowchart showing a method for accessing a wireless network according to an exemplary embodiment of the present disclosure.

FIG. 4 is a flowchart showing a method for accessing a wireless network according to an exemplary embodiment of the present disclosure. The method is applied to the router described above. As shown in FIG. 4, the method includes the following steps.

In step S31, a first connection with a device to be connected with the wireless network is established according to first access information, so as to support the device in accessing a part of one or more servers.

The device to be connected with the wireless network can be the smart device described above. The part of one or more servers includes one or more servers used for performing a verification on the smart device. The smart device can be a XiaoMi smart plug and/or a XiaoMi bracelet. The part of one or more servers includes a XiaoMi server.

In step S32, device verification information sent by the device is received.

In step S33, the device verification information is sent to the part of one or more servers, such that the part of one or more servers performs a verification on the device.

In step S34, after the device verification information passes the verification performed by the part of one or more servers, a second connection is established with the device according to second access information, so as to support the device in accessing all of the one or more servers.

After the device is connected to the target router according to the second access information, all of the one or more servers in the entire internet can be accessed by the device.

In the present embodiments, the target router first establishes a connection with the device to be connected with the wireless network via the wireless network that supports accessing only a part of one or more servers. The target router then sends the device verification information of the device to the part of one or more servers for verification. After the verification is successfully performed, the target router establishes a connection with the device according to the second access information, such that the device can access all of the one or more servers to perform data transmission. When the device is connected with the target router and accesses all of the one or more servers, a user does not need to manually choose the wireless network and input a password. As a result, the accessing process is convenient, and the user experience is improved.

Figure 5:
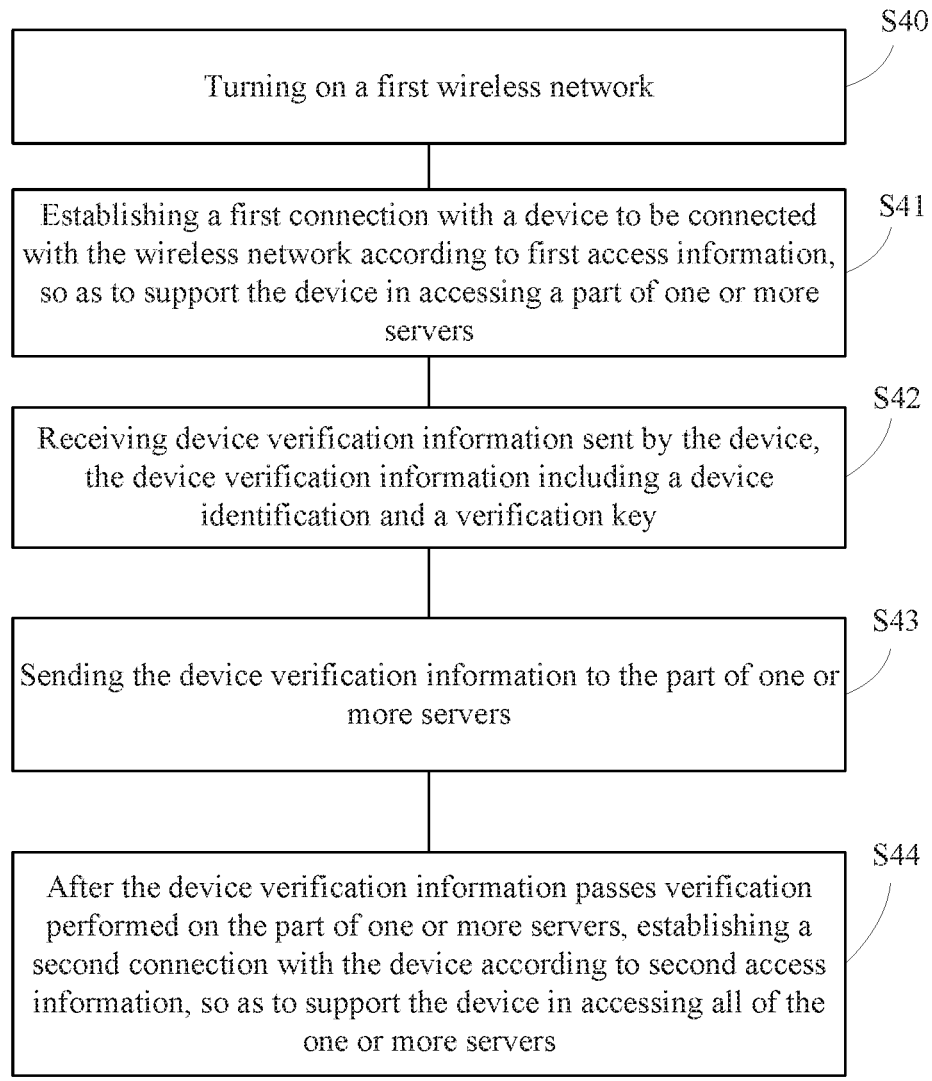
FIG. 5 is a flowchart showing a method for accessing a wireless network according to an exemplary embodiment of the present disclosure.

FIG. 5 is a flowchart showing a method for accessing a wireless network according to an exemplary embodiment of the present disclosure. The method is applied to the router (e.g., the target router) described above. As shown in FIG. 5, the method includes the following steps.

In step S40, a first wireless network is turned on. The first wireless network supports accessing a part of one or more servers. The first wireless network is an unencrypted wireless network or a wireless network with a set password.

In an embodiment of the present disclosure, the router receives a start instruction sent by a mobile terminal. The start instruction is used to turn on the first wireless network. The first wireless network is turned on according to the start instruction.

In another embodiment of the present disclosure, the first wireless network of the router can also be turned on when the router is started, such that the mobile terminal does not need to send the start instruction.

In the present embodiment, the first wireless network is pre-configured to include a password (which is null or is a pre-set password) and a router filtering (e.g., only allowing data associated with the part of one or more servers as a destination address to pass).

In step S41, a first connection is established with a device to be connected with the wireless network according to first access information, so as to support the device in accessing a part of one or more servers.

The device can be the smart device described above. The part of one or more servers includes one or more servers used for performing a verification on the smart device. For example, the smart device can be a XiaoMi smart plug and/or a XiaoMi bracelet. The part of one or more servers includes a XiaoMi server.

The first access information includes an identification of a first wireless network. Alternatively or additionally, the first access information includes the identification and a password of the first wireless network. The first wireless network supports accessing the part of one or more servers.

Other operations may be included in Step S41. For example, in some embodiments, a verification request sent by the device is received. The verification request includes the identification of the first wireless network, or the identification and the password of the first wireless network. If the first wireless network has no password, a verification response is returned directly. If the first wireless network has the password, the verification response is returned after a verification on the password is performed. After the verification response is returned to the device, the device is associated with the first wireless network, such that the device is connected to the first wireless network.

In step S42, device verification information sent by the device is received. The device verification information includes a device identification and a verification key.

The device verification information is used for verifying the device to be connected with the wireless network by the part of one or more servers.

In step S43, the device verification information is sent to the part of one or more servers.

In step S44, after the device verification information passes the verification performed by the part of one or more servers, a connection is established with the device according to second access information, such that the device is connected to the second wireless network and can access all of the one or more servers. The second access information includes the identification and the password of the second wireless network. The second wireless network supports accessing all of the one or more servers.

In an embodiment of the present disclosure, establishing a connection with the device according to second access information includes: receiving instructions sent by the part of one or more servers, the instructions being used to instruct the router to send the second access information to the device; and sending the second access information to the device.

In another embodiment of the present disclosure, establishing a connection with the device according to second access information includes: receiving the second access information sent by the part of one or more servers; and sending the second access information to the device.

After sending the second access information to the device, the router receives the verification request sent by the device. The verification request includes the identification and the password of the second wireless network. If the password of the second wireless network passes the verification, the router returns the verification response. The router also receives the association request sent by the device, and returns the association confirmation to the device. After the association is completed, the device can perform data exchange with the target router.

In the present embodiments, the router first establishes the connection with the device via the wireless network that supports accessing only a part of one or more servers. The router then sends the device verification information of the device to the part of one or more servers for verification. After the verification is successfully performed, the router establishes the connection with the device according to the second access information, such that the device can access all of the one or more servers to perform data transmission. When the device accesses the router and all of the one or more servers, the user does not need to manually choose the wireless network and input a password. As a result, the accessing process is convenient, and the user experience is improved.

Figure 6:
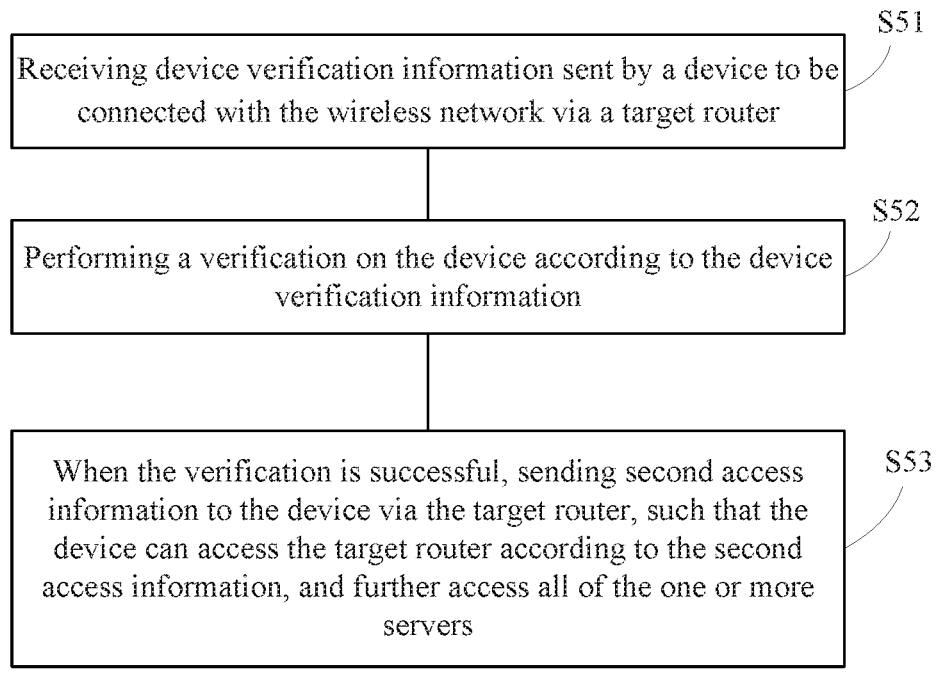
FIG. 6 is a flowchart showing a method for accessing a wireless network according to an exemplary embodiment of the present disclosure.

FIG. 6 is a flowchart showing a method for accessing a wireless network according to an exemplary embodiment of the present disclosure. The method is applied to one or more servers described above (e.g., performed by the one or more servers). As shown in FIG. 6, the method includes the following steps.

In step S51, device verification information sent by a device to be connected with the wireless network via a target router is received.

The device to be connected with the wireless network can be the smart device described above, for example, a Xiaomi smart plug and/or a Xiaomi bracelet. The target router can be the router described above, for example, a Xiaomi router.

In step S52, a verification is performed on the device according to the device verification information.

In step S53, when the verification is successful, second access information is sent to the device via the target router, such that the device can access the target router according to the second access information, and further access all of the one or more servers.

In the present embodiments, a part of one or more servers performs the verification on the device according to the device verification information, and sends the second access information to the device via the target router when the device passes the verification, such that the device can access the target router according to the second access information, and further access all of the one or more servers to perform data transmission. When the device accesses the second wireless network, the user does not need to manually choose the wireless network and input a password. As a result, the accessing process is convenient, and the user experience is improved.

Figure 7:
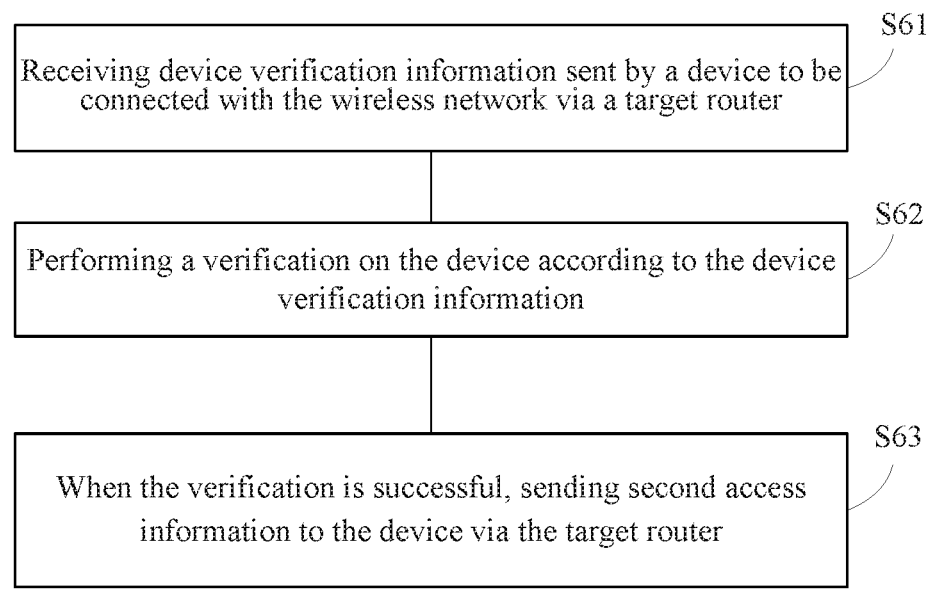
FIG. 7 is a flowchart showing a method for accessing a wireless network according to an exemplary embodiment of the present disclosure.

FIG. 7 is a flowchart showing a method for accessing a wireless network according to an exemplary embodiment of the present disclosure. The method is applied to a server (or more than one servers) described above (e.g., performed by the server or more than one servers). As shown in FIG. 7, the method includes the following steps.

In step S61, device verification information sent by a device to be connected with the wireless network via a target router is received, the device verification information including a device identification and a verification key.

The device to be connected with the wireless network can be the smart device described above, for example, a Xiaomi smart plug and/or a Xiaomi bracelet. The target router can be the router described above, for example, a Xiaomi router. The server receives the device verification information sent by the device via the first wireless network. The first wireless network is configured to support the device in accessing a part of the server (or a part of one or more servers).

In step S62, a verification is performed on the device according to the device verification information.

The verification key is generated by the server, and programmed into the device to be connected with the wireless network when the device is manufactured. The server stores a correspondence relationship between respective verification keys and device identifications. The server performs the verification on the device identification and the verification key, including: searching for the device identification and the verification key sent by the device in the server, determining that the verification is successful if the device identification and the verification key sent by the device are stored in the server and match with each other; otherwise, determining that the verification is not successful.

In step S63, when the verification is successful, second access information is sent to the device via the target router, such that the device can access the target router according to the second access information, and further access all of the server (or all of the one or more servers). The second access information includes an identification and a password of a second wireless network. The second wireless network supports accessing all of the server (or all of the one or more servers).

In an embodiment of the present disclosure, sending second access information to the device via the target router includes sending an instruction to the target router so as to instruct the target router to send the second access information to the device.

In another embodiment of the present disclosure, sending second access information to the device via the target router includes sending the second access information to the target router, such that the target router sends the second access information to the device.

In the present embodiments, the server (or a part of the one or more servers) performs the verification on the device to be connected with the wireless network according to the device verification information, and sends the second access information to the device via the target router when the device passes the verification, such that the device can access the target router according to the second access information, and further access all of the server (or all of the one or more servers) to perform data transmission. When the device accesses the second wireless network, the user does not need to manually choose the wireless network and input a password. As a result, the accessing process is convenient, and the user experience is improved.

Figure 8:
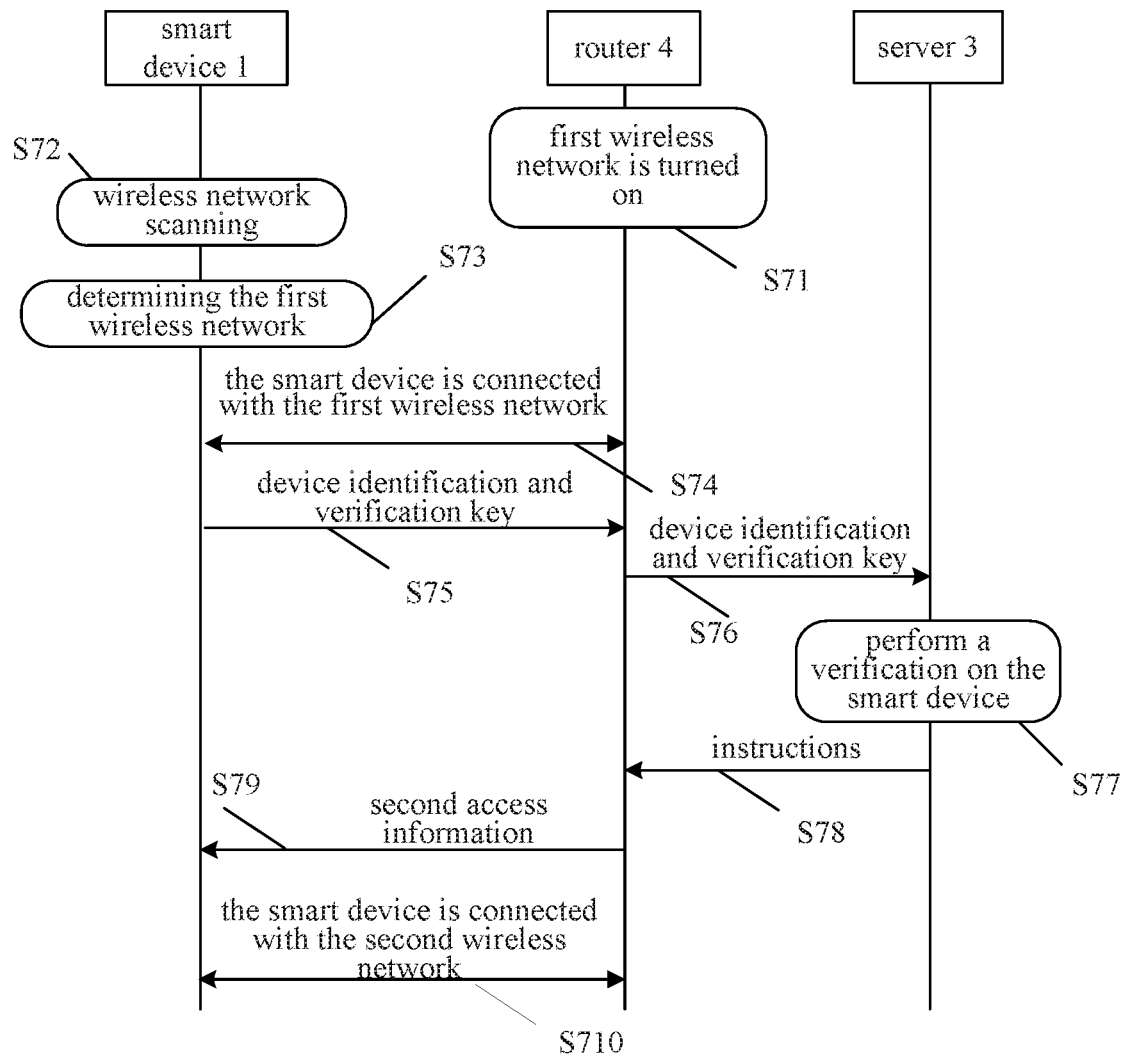
FIG. 8 is a flowchart showing a method for accessing a wireless network according to an exemplary embodiment of the present disclosure.

FIG. 8 is a flowchart showing a method for accessing a wireless network according to an exemplary embodiment of the present disclosure. As shown in FIG. 8, the method includes the following steps.

In step S71, the router (e.g., the target router) turns on a first wireless network. The first wireless network is used for supporting a smart device (e.g., the device to be connected with the wireless network) in accessing a part of one or more servers (e.g., a part of server 3 in the embodiment shown in FIG. 8). The first wireless network is an unencrypted wireless network or a wireless network with a set password.

In step S72, the smart device periodically performs a wireless network scanning, and obtains an identification list of accessible wireless networks.

In step S73, the smart device determines whether there is an identification of the first wireless network in the identification list. If the smart device determines that the identification of the first wireless network is included in the identification list, the smart device determines that the first wireless network is detected in the scanning.

In step S74, the smart device is connected with the first wireless network.

In step S75, the smart device sends a device identification and a verification key of the smart device to the router via the first wireless network.

In step S76, the router sends the device identification and the verification key of the smart device to the part of one or more servers.

In step S77, the part of one or more servers performs a verification on the device identification and the verification key, so as to perform a verification on the smart device.

In step S78, when the verification is successful, the part of one or more servers sends instructions to the router. The instructions are used to instruct the router to send second access information to the smart device, and the instructions include the device identification of the smart device.

If the verification is not successful, the part of one or more servers sends verification failure information to the router (not shown in FIG. 8), so as to inform the router that the smart device is an unauthorized user, and the smart device should not be allowed to be connected with a second wireless network.

In step S79, the router sends the second access information to the smart device. The second access information includes an identification and a password of a second wireless network.

In step S710, the smart device is connected with the second wireless network using the password of the second wireless network.

The detailed implementation of the above steps are described in the discussion of the above embodiments, which are not repeated herein.

In the present disclosure, the smart device first sends the device verification information to the part of one or more servers for performing the verification via the wireless network that supports accessing only the part of one or more servers. The smart device then obtains the second access information after the verification is successfully performed, such that the target router is accessed according to the second access information. Subsequently, all of the one or more servers are accessed to perform data transmission. When the smart device accesses the target router and all of the one or more servers, the user does not need to manually choose the wireless network and input a password. As a result, the accessing process is convenient, and the user experience is improved.

Figure 9:
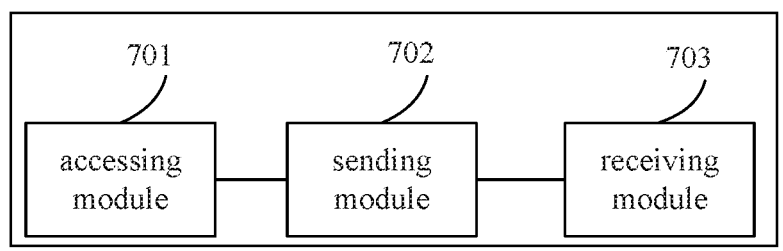
FIG. 9 is a block diagram of a device for accessing a wireless network according to an exemplary embodiment of the present disclosure.

FIG. 9 is a block diagram of a device for accessing a wireless network according to an exemplary embodiment of the present disclosure. The device can be the smart device described above. As shown in FIG. 9, the device includes an accessing module 701, a sending module 702, and a receiving module 703.

The accessing module 701 is configured to access a target router according to first access information, so as to access a part of one or more servers.

The sending module 702 is configured to send device verification information to the part of one or more servers.

The receiving module 703 is configured to receive second access information. The second access information is sent by the target router when the device verification information passes verification performed by the part of one or more servers.

The accessing module 701 is further configured to access the target router according to the second access information, so as to access all of the one or more servers.

In the present disclosure, the smart device first sends the device verification information to the part of one or more servers for performing the verification via the wireless network that supports accessing only the part of one or more servers. The smart device then obtains the second access information after the verification is successfully performed, such that the target router is accessed according to the second access information. Subsequently, all of the one or more servers are accessed to perform data transmission. When the smart device accesses the target router and all of the one or more servers, the user does not need to manually choose the wireless network and input a password. As a result, the accessing process is convenient, and the user experience is improved.

Figure 10:
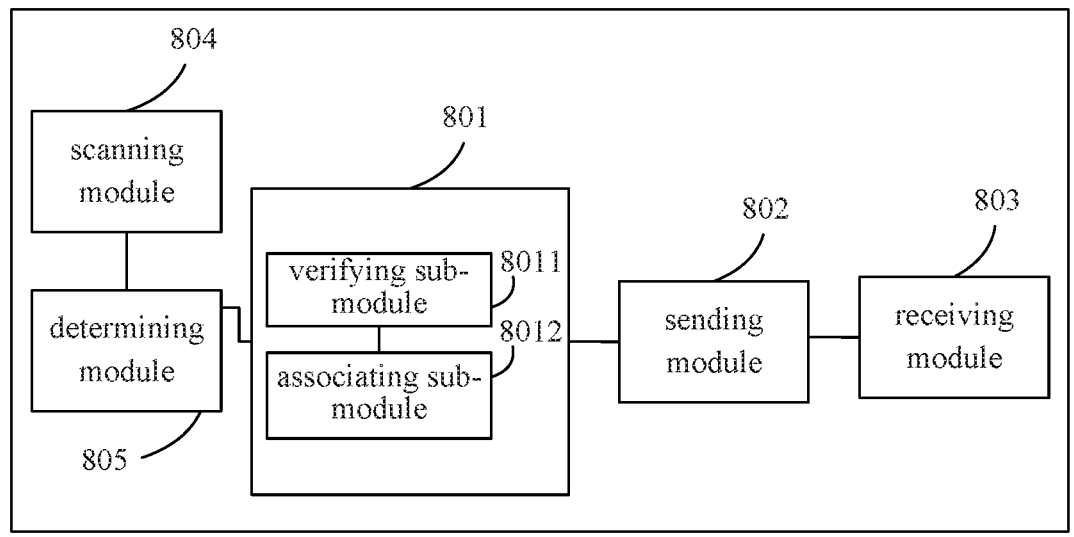
FIG. 10 is a block diagram of a device for accessing a wireless network according to another exemplary embodiment of the present disclosure.

FIG. 10 is a block diagram of a device for accessing a wireless network according to an exemplary embodiment of the present disclosure. The device can be the smart device described above. As shown in FIG. 10, the device includes an accessing module 801, a sending module 802, and a receiving module 803.

The accessing module 801 is configured to access a target router according to first access information, so as to access a part of one or more servers. The first access information includes an identification of a first wireless network. Alternatively or additionally, the first access information includes the identification and a password of the first wireless network. The first wireless network supports accessing the part of one or more servers.

The first access information can be pre-stored in a local non-transitory storage medium.

The sending module 802 is configured to send device verification information to the part of one or more servers. The device verification information includes a device identification and a verification key.

The verification key is generated by a server, and programmed into the smart device when the smart device is manufactured. The server stores a correspondence relationship between respective verification keys and device identifications. The server performs the verification on the smart device according to the stored correspondence relationship between respective verification keys and device identifications. If the device identification and the verification key sent by the smart device are stored in the server and match with each other, the verification is successful.

The receiving module 803 is configured to receive second access information. The second access information is sent by the target router when the device verification information passes verification performed by the part of one or more servers. The second access information includes an identification and a keyword of a second wireless network. The second wireless network supports accessing all of the one or more servers.

The accessing module 801 is further configured to access the target router according to the second access information, so as to access all of the one or more servers.

The accessing module 801 includes a verifying sub-module 8011 configured to send a verification request to the target router. The verification request includes the identification of the first wireless network. Alternatively or additionally, the verification request includes the identification and the password of the first wireless network. The first wireless network is provided by the target router. The accessing module 801 also includes an associating sub-module 8012 configured to associate the smart device with the first wireless network, so as to enable to the smart device to be connected with the first wireless network when a verification response returned by the target router is received.

The associating sub-module 8012 is configured to send an association request to the target router, and to receive an association confirmation returned by the target router. After the association is completed, the smart device can perform data exchange with the target router.

In an embodiment of the present disclosure, the receiving module 803 is configured to receive the second access information sent by the target router. The second access information is sent by the target router according to instructions from the part of one or more servers. Before sending the second access information to the smart device, the target router receives the instructions from the part of one or more servers. The instructions are used to indicate to the target router that the smart device passes the verification. The instructions include the device identification of the smart device.

In another embodiment of the present disclosure, the receiving module 803 is configured to receive the second access information sent by the part of one or more servers. The second access information sent by the part of one or more servers can be pre-uploaded to the part of one or more servers by the target router.

The device further includes a scanning module 804 and a determining module 805. The scanning module 804 is configured to periodically perform a wireless network scanning to obtain an identification list of accessible wireless networks.

For example, the scanning module 804 periodically receives beacon frames sent by a router, and determines the identification list of the accessible wireless networks according to identifications of the wireless networks included in the beacon frames.

The identification of the wireless network is a Service Set Identifier (SSID) of the wireless network, and the identification list of the accessible wireless networks includes multiple SSIDs of the wireless networks.

In the present embodiments, the identification of the first wireless network can be pre-stored in the smart device.

The determining module 805 is configured to determine whether the identification of the first wireless network exists in the identification list. When the identification of the first wireless network exists in the identification list, the determining module 805 determines that the first wireless network is detected in the scanning.

If the identification of the first wireless network does not exist in the identification list, the wireless network scanning is repeatedly performed until the first wireless network is detected.

In the present embodiments, the smart device first sends the device verification information to the part of one or more servers for performing a verification via the wireless network that supports accessing only the part of one or more servers. The smart device then obtains the second access information after the verification is successfully performed, such that the target router is accessed according to the second access information. Subsequently, all of the one or more servers are accessed to perform data transmission. When the smart device accesses the target router and all of the one or more servers, the user does not need to manually choose the wireless network and input a password. As a result, the accessing process is convenient, and the user experience is improved.

Figure 11:
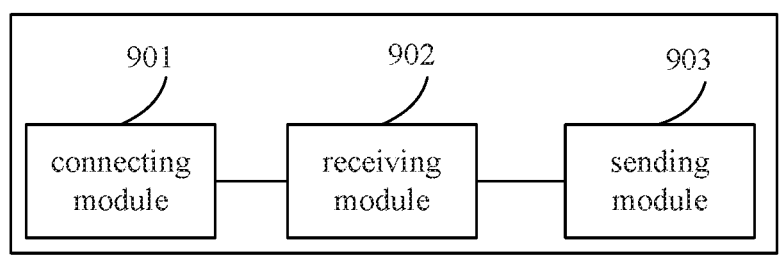
FIG. 11 is a block diagram of a device for accessing a wireless network according to an exemplary embodiment of the present disclosure.

FIG. 11 is a block diagram of a device for accessing a wireless network according to an exemplary embodiment of the present disclosure. The device can be the router described above. As shown in FIG. 11, the router includes a connecting module 901, a receiving module 902, and a sending module 903.

The connecting module 901 is configured to establish a first connection with a device to be connected with the wireless network according to first access information, so as to support the device to be connected with the wireless network in accessing a part of one or more servers.

The receiving module 902 is configured to receive device verification information sent by the device to be connected with the wireless network.

The sending module 903 is configured to send the device verification information received by the receiving module 902 to the part of one or more servers.

The connecting module 901 is further configured to establish a second connection with the device to be connected with the wireless network according to second access information after the device verification information passes a verification performed by the part of one or more servers, so as to support the device to be connected with the wireless network in accessing all of the one or more servers.

In the present embodiments, the router first establishes the connection with the device to be connected with the wireless network via the wireless network that supports accessing only the part of one or more servers. The router then sends the device verification information of the device to be connected with the wireless network to the part of one or more servers for the verification. After the verification is successfully performed, the router establishes the connection with the device to be connected with the wireless network according to the second access information, such that the device is connected with the wireless network to access all of the one or more servers and perform data transmission. When the device to be connected with the wireless network connects with the router and accesses all of the one or more servers, the user does not need to manually choose the wireless network and input a password. As a result, the accessing process is convenient, and the user experience is improved.

Figure 12:
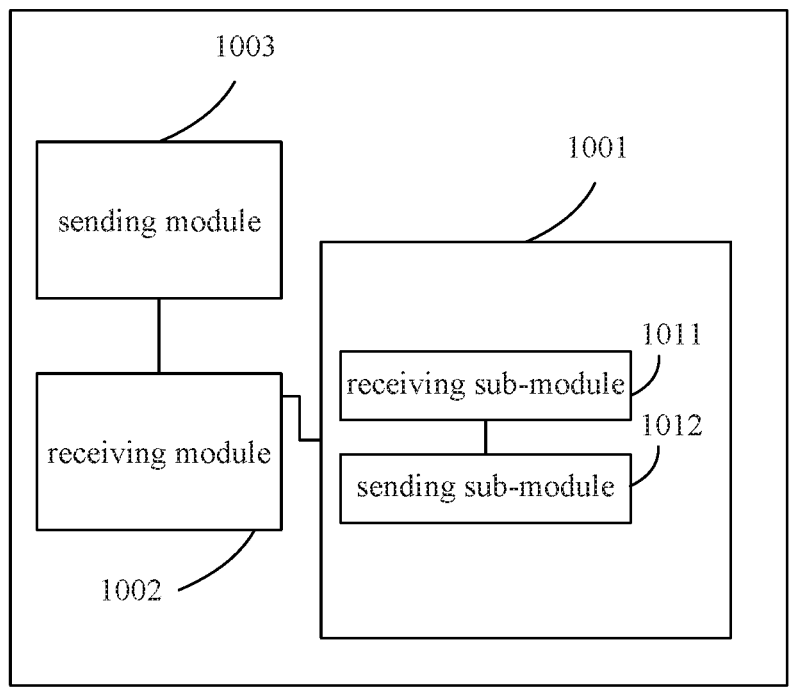
FIG. 12 is a block diagram of a device for accessing a wireless network according to an exemplary embodiment of the present disclosure.

FIG. 12 is a block diagram of a device for accessing a wireless network according to an exemplary embodiment of the present disclosure. The device can be the router described above. As shown in FIG. 12, the router includes the following modules.

The router includes a connecting module 1001. The connecting module 1001 is configured to establish a first connection with a device to be connected with the wireless network according to first access information, so as to support the device to be connected with the wireless network in accessing a part of one or more servers.

The first access information includes an identification of a first wireless network. Alternatively or additionally, the first access information includes the identification and a password of the first wireless network. The first wireless network supports accessing the part of one or more servers.

The router includes a receiving module 1002. The receiving module 1002 is configured to receive device verification information sent by the device to be connected with the wireless network. The device verification information includes a device identification and a verification key.

The router includes a sending module 1003. The sending module 1003 is configured to send the device verification information received by the receiving module 1002 to the part of one or more servers.

The connecting module 1001 is further configured to establish a second connection with the device to be connected with the wireless network according to second access information after the device verification information passes a verification performed by the part of one or more servers, so as to support the device to be connected with the wireless network in accessing all of one or more the servers.

The second access information includes an identification and a password of a second wireless network. The second wireless network supports accessing all of the one or more servers.

The connecting module 1001 is configured to receive a verification request sent by the device to be connected with the wireless network. The verification request includes the identification of the first wireless network, or the identification and the password of the first wireless network. If the first wireless network has no password, a verification response is returned directly. If the first wireless network has the password, the verification response is returned after a verification on the password is performed. After returning the verification response to the device to be connected with the wireless network, the connecting module 1001 associates the device to be connected with the wireless network with the first wireless network, such that the device to be connected with the wireless network is connected with the first wireless network.

As shown in FIG. 12, the connecting module 1001 includes a receiving sub-module 1011 configured to receive instructions sent by the part of one or more servers. The instructions are used to instruct the router to send the second access information to the device to be connected with the wireless network. The connecting module 1001 also includes a sending sub-module 1012 configured to send the second access information to the device to be connected with the wireless network.

Alternatively, receiving sub-module 1011 included in the connecting module 1001 is configured to receive the second access information sent by the part of one or more servers, and the sending sub-module 1012 is configured to send the second access information received by the receiving sub-module 1011 to the device to be connected with the wireless network.

In some embodiments, the router includes a starting module configured to turn on the first wireless network. The starting module is configured to receive a start instruction sent by a mobile terminal. The start instruction is used to turn on the first wireless network.

In another embodiment of the present disclosure, the first wireless network can be turned on when the router is started, such that the mobile terminal does not need to send the start instruction.

In the present embodiment, the first wireless network is pre-configured to include a password (which is null or is a set password) and a router filtering (e.g., only allowing data associated with the part of one or more servers as a destination address to pass).

The connecting module 1001 is further configured to establish a second connection with the device to be connected with the wireless network according to the second access information. The connecting module 1001 is configured to receive a verification request sent by the device to be connected with the wireless network. The verification request includes an identification and a password of the second wireless network. The connecting module 1001 is configured to return a verification response if the password of the second wireless network passes the verification. The connecting module 1001 is also configured to receive an association request sent by the device to be connected with the wireless network, and return an association confirmation to the device to be connected with the wireless network. After the association is completed, the device to be connected with the wireless network can perform data exchange with the router.

In the present embodiments, the router first establishes the connection with the device to be connected with the wireless network via the wireless network that supports accessing only the part of one or more servers. The router then sends the device verification information of the device to be connected with the wireless network to the part of one or more servers for verification. After the verification is successfully performed, the router establishes the connection with the device to be connected with the wireless network according to the second access information, such that the device to be connected with the wireless network can access all of the one or more servers to perform data transmission. When the device to be connected with the wireless network connects with the router and accesses all of the one or more servers, the user does not need to manually choose the wireless network and input a password. As a result, the accessing process is convenient, and the user experience is improved.

Figure 13:
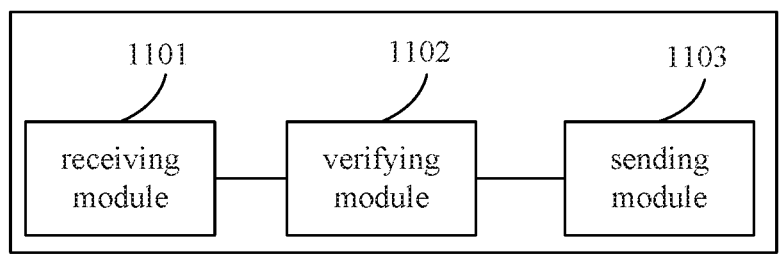
FIG. 13 is a block diagram of a device for accessing a wireless network according to an exemplary embodiment of the present disclosure.

FIG. 13 is a block diagram of a device for accessing a wireless network according to an exemplary embodiment of the present disclosure. The device can be the server described above. As shown in FIG. 13, the server includes a receiving module 1101, a verifying module 1102, and a sending module 1103.

The receiving module 1101 is configured to receive device verification information sent by a device to be connected with the wireless network via a target router.

The verifying module 1102 is configured to perform a verification on the device to be connected with the wireless network according to the device verification information.

The sending module 1103 is configured to send second access information to the device to be connected with the wireless network via the target router when the verification is successfully performed, such that the device to be connected with the wireless network accesses the target router according to the second access information, and subsequently accesses all of the one or more servers.

In the present embodiment, the server (or part of the one or more servers) performs the verification on the device to be connected with the wireless network according to the device verification information, and sends the second access information to the device to be connected with the wireless network via the target router when the device to be connected with the wireless network passes the verification, such that the device to be connected with the wireless network is connected with the target router according to the second access information. Subsequently, the device can access all of the one or more servers to perform data transmission. When the device to be connected with the wireless network accesses the second wireless network, the user does not need to manually choose the wireless network and input a password. As a result, the access process is convenient, and the user experience is improved.

Figure 14:
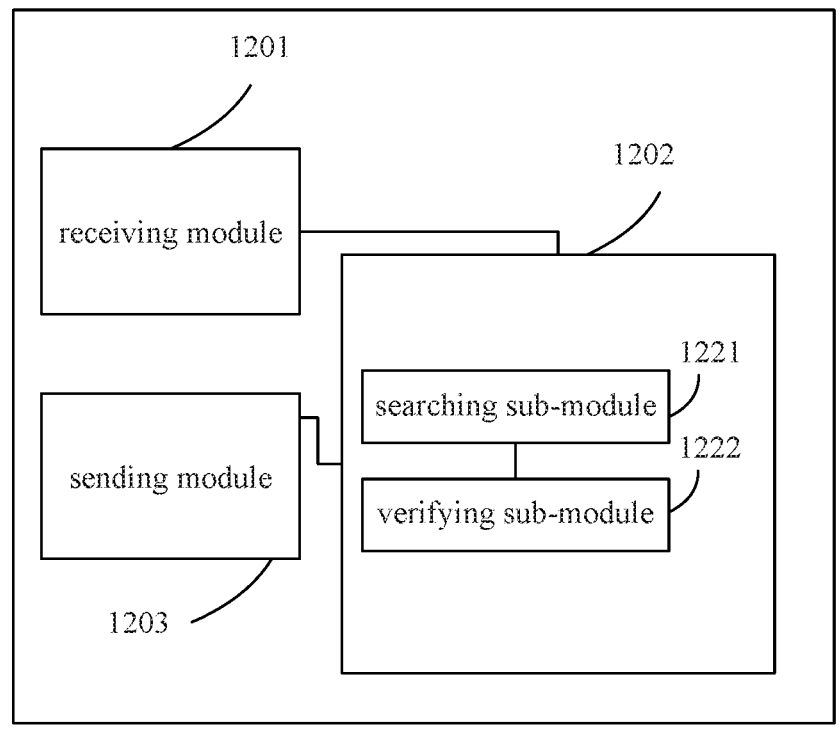
FIG. 14 is a block diagram of a device for accessing a wireless network according to an exemplary embodiment of the present disclosure.

FIG. 14 is a block diagram of a device for accessing a wireless network according to another exemplary embodiment of the present disclosure. The device can be the server described above. As shown in FIG. 14, the server includes the following modules.

The server includes a receiving module 1201. The receiving module 1201 is configured to receive device verification information sent by a device to be connected with the wireless network via a target router.

The server includes a verifying module 1202. The verifying module 1202 is configured to perform a verification on the device to be connected with the wireless network according to the device verification information. The device verification information includes a device identifier and a verification key.

The verification key is generated by the server, and programmed into the device to be connected with the wireless network when the device is manufactured. The verifying module 1202 includes a searching sub-module 1221 configured to search for the device identification and the verification key sent by the device to be connected with the wireless network in the server. The verifying module 1202 also includes a verifying sub-module 1222 configured to determine that the verification is successful if the device identification and the verification key set by the device to be connected with the wireless network are stored in the server and match with each other. The verifying sub-module 1222 is also configured to determine that the verification is not successful if the device identification and the verification key set by the device to be connected with the wireless network are not stored in the server or do not match with each other.

The server includes a sending module 1203. The sending module 1203 is configured to send second access information to the device to be connected with the wireless network via the target router when the verification is successfully performed, such that the device to be connected with the wireless network can access the target router according to the second access information, and subsequently, access all of the one or more servers.

The second access information includes an identification and a password of a second wireless network. The second wireless network supports accessing all of the one or more servers.

The sending module 1203 is configured to send an instruction to the target router to instruct the target router to send the second access information to the device to be connected with the wireless network.

Alternatively, the sending module 1203 is configured to send the second access information to the target router, such that the second access information is sent to the device to be connected with the wireless network by the target router.

In the present embodiment, the server performs the verification on the device to be connected with the wireless network according to the device verification information, and sends the second access information to the device to be connected with the wireless network via the target router when the device to be connected with the wireless network passes the verification, such that the device to be connected with the wireless network is connected with the target router according to the second access information. Subsequently, the device can access all of the one or more servers to perform data transmission. When the device to be connected with the wireless network accesses the second wireless network, the user does not need to manually choose the wireless network and input a password. As a result, the accessing process is convenient, and the user experience is improved.

With respect to the devices disclosed in the above embodiments, the specific operation modes of individual modules therein have been described in detail in the discussion of the embodiments of the methods. Therefore, the descriptions of the operation modes of the individual modules are not repeated herein.

Figure 15:
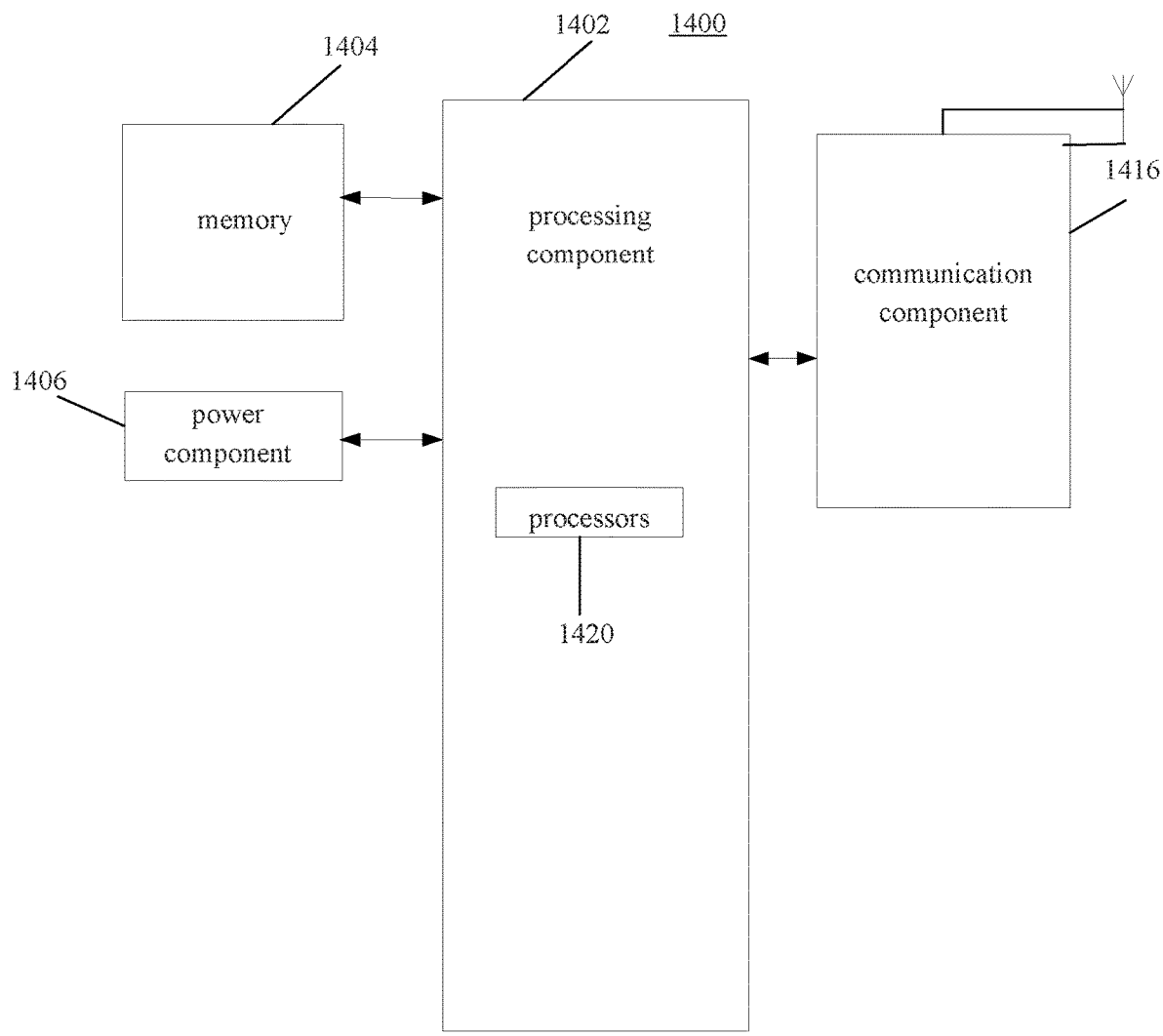
FIG. 15 is a schematic diagram of a device for accessing a wireless network according to an exemplary embodiment of the present disclosure.

FIG. 15 is a schematic diagram of a device 1400 for accessing a wireless network according to an exemplary embodiment of the present disclosure. The device 1400 can be a smart device.

As shown in FIG. 15, the device 1400 includes one or more of the following components: a processing component 1402, a memory 1404, a power component 1406, and a communication component 1416.

The processing component 1402 is configured to control overall operations of the device 1400, such as the operations associated with display, telephone calls, and data communications, camera operations, and recording operations. The processing component 1402 includes one or more processors 1420 configured to execute instructions to perform all or part of the disclosed methods. Moreover, the processing component 1402 includes one or more modules configured to facilitate the interaction between the processing component 1402 and other components. For example, in some embodiments, the processing component 1402 includes a multimedia module configured to facilitate the interaction between the multimedia component and the processing component 1402.

The memory 1404 is configured to store various types of data to support the operation of the device 1400. Examples of such data include instructions for any applications or methods operated by the device 1400, contact data, phone-book data, messages, pictures, video, etc. The memory 1404 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1406 is configured to provide power to various components of the device 1400. The power component 1406 includes a power management system, one or more power sources, and any other components associated with the generation, management, and distribution of power in the device 1400.

The communication component 1416 is configured to facilitate wired or wireless communication between the device 1400 and other devices. The device 1400 can access a wireless network based on a communication standard, such as WIFI, 2G, 3G, 4G, or a combination thereof. In one embodiment, the communication component 1416 receives a broadcast signal or broadcast associated information from an external broadcast management system via a broadcast channel. In one embodiment, the communication component 1416 further includes a near field communication (NFC) module configured to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 1400 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as the memory 1404 including instructions. The instructions are executable by the processor 1420 included in the device 1400, for performing the above-described methods. For example, the non-transitory computer-readable storage medium can be a ROM, a RAM, a CD-ROM, a magnetic tape, a floppy disc, an optical data storage device, and the like.

In some embodiments, there is also provided a non-transitory computer readable storage medium having instructions that, when executed by the processor in a device, cause the device to execute a method for accessing a wireless network. The method includes accessing a target router according to first access information, so as to access a part of one or more servers. The method also includes sending device verification information to the part of one or more servers; and receiving second access information, the second access information being sent by the target router when the device verification information passes verification performed by the part of one or more servers. The method further includes accessing the target router according to the second access information, so as to access all of the one or more servers.

In an embodiment of the present disclosure, receiving second access information includes receiving the second access information sent by the target router, the second access information being sent by the target router according to instructions from the part of one or more servers.

In another embodiment of the present disclosure, receiving second access information includes receiving the second access information sent by the part of one or more servers.

In the present embodiments, the second access information can be sent by the part of one or more servers, or by the router, such that diversified demands are satisfied.

In an embodiment of the present disclosure, the device verification information includes a device identification and a verification key.

In an embodiment of the present disclosure, the first access information includes an identification of a first wireless network. Alternatively or additionally, the first access information includes the identification and a password of the first wireless network. The first wireless network supports accessing the part of one or more servers.

The second access information includes an identification and a password of a second wireless network. The second wireless network supports accessing all of the one or more servers.

Figure 16:
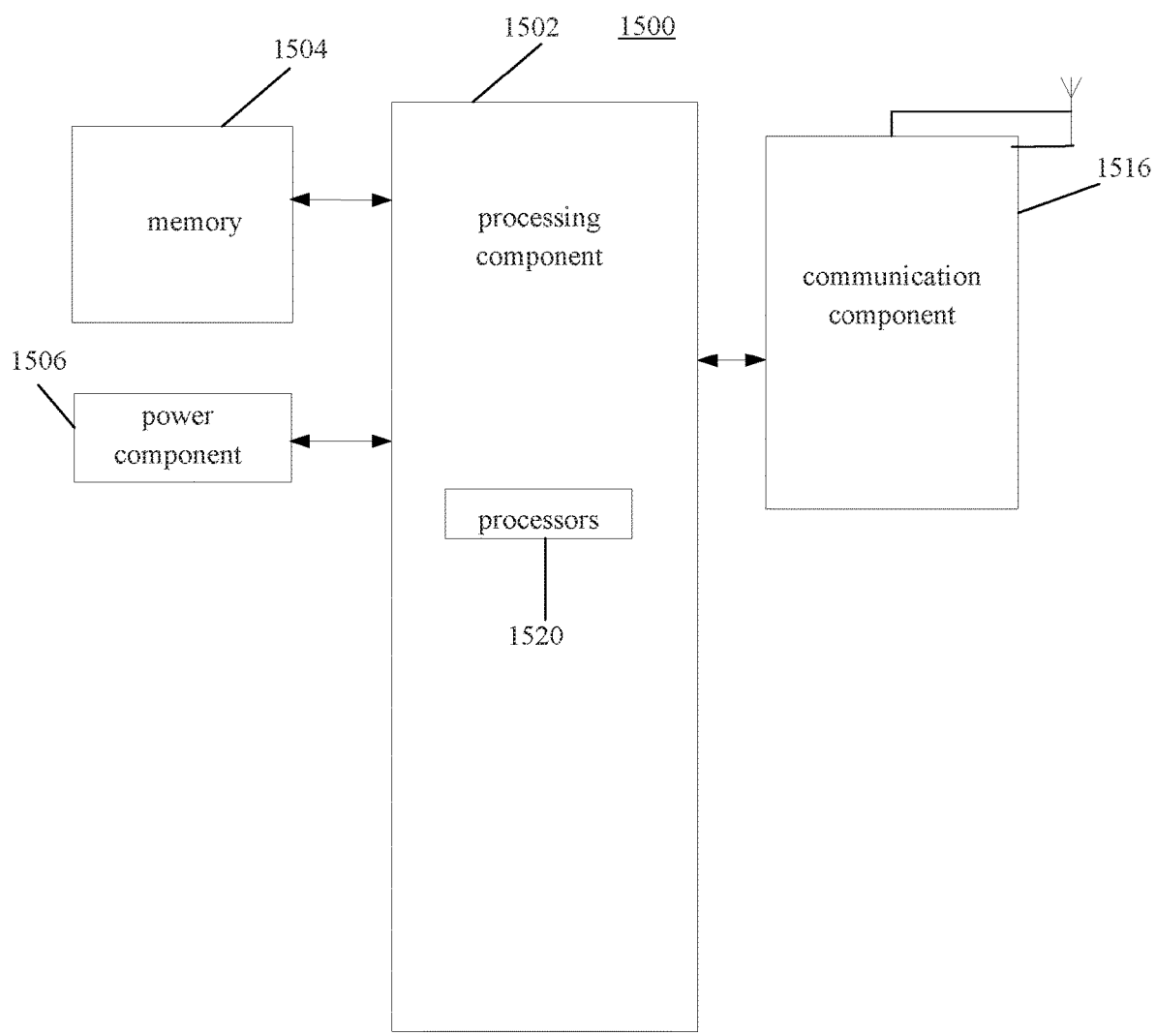
FIG. 16 is a schematic diagram of a device for accessing a wireless network according to an exemplary embodiment of the present disclosure.

FIG. 16 is a schematic diagram of a device 1500 for accessing a wireless network according to an exemplary embodiment of the present disclosure. The device 1500 can be a router.

As shown in FIG. 16, the device 1500 includes one or more of the following components: a processing component 1502, a memory 1504, a power component 1506, and a communication component 1516.

The processing component 1502 is configured to control overall operations of the device 1500, such as the operations associated with display, telephone calls, and data communications, camera operations, and recording operations. The processing component 1502 includes one or more processors 1520 configured to execute instructions to perform all or part of the disclosed methods. In some embodiments, the processing component 1502 includes one or more modules configured to facilitate the interaction between the processing component 1502 and other components. For example, in some embodiments, the processing component 1502 includes a multimedia module configured to facilitate the interaction between the multimedia component and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1506 is configured to provide power to various components of the device 1500. The power component 1506 includes a power management system, one or more power sources, and any other components associated with the generation, management, and distribution of power in the device 1500.

The communication component 1516 is configured to facilitate wired or wireless communication between the device 1500 and other devices. The device 1500 can access a wireless network based on a communication standard, such as WIFI, 2G, 3G, 4G, or a combination thereof. In one embodiment, the communication component 1516 receives a broadcast signal or broadcast associated information from an external broadcast management system via a broadcast channel. In one embodiment, the communication component 1516 further includes a near field communication (NFC) module configured to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 1500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as the memory 1504 including instructions. The instructions are executable by the processor 1520 in the device 1500, for performing the above-described methods. For example, the non-transitory computer-readable storage medium can be a ROM, a RAM, a CD-ROM, a magnetic tape, a floppy disc, an optical data storage device, and the like.

In some embodiments, there is also provided a non-transitory computer readable storage medium having instructions stored therein that, when executed by the processor in a device, cause the device to execute a method for accessing a wireless network. The method includes establishing a first connection with a device to access the wireless network according to first access information, so as to support the device to access a part of one or more servers. The method also includes receiving device verification information sent by the device; and sending the device verification information to the part of one or more servers. The method further includes after the device verification information passes verification performed by the part of one or more servers, establishing a second connection with the device according to second access information, so as to support the device to access all of the one or more servers.

In an embodiment of the present disclosure, establishing a second connection with the device according to second access information includes: receiving instructions sent by the part of one or more servers, the instructions being used to instruct a component (e.g., a router) to send the second access information to the device; and sending the second access information to the device.

In another embodiment of the present disclosure, establishing a second connection with the device according to second access information includes: receiving the second access information sent by the part of one or more servers; and sending the second access information to the device.

In an embodiment of the present disclosure, the device verification information includes a device identification and a verification key.

In an embodiment of the present disclosure, the first access information includes an identification of a first wireless network. Alternatively or additionally, the first access information includes the identification and a password of the first wireless network. The first wireless network supports accessing the part of one or more servers.

The second access information includes an identification and a password of a second wireless network. The second wireless network supports accessing all of the one or more servers.

Figure 17:
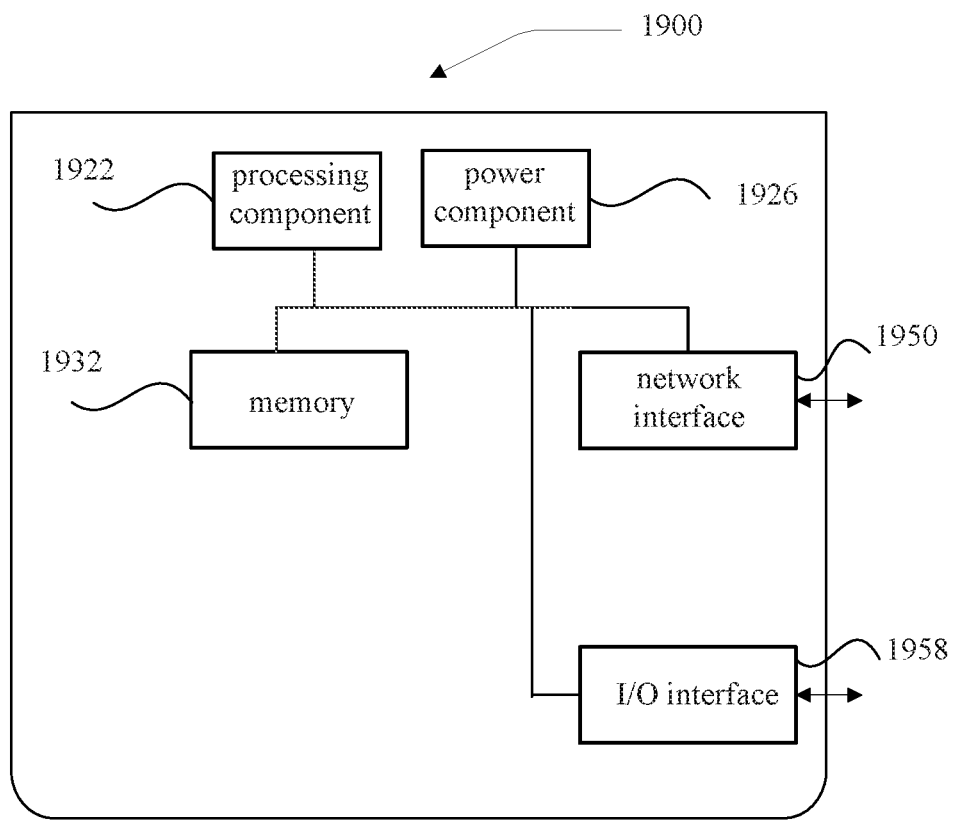
FIG. 17 is a schematic diagram of a device for accessing a wireless network according to an exemplary embodiment of the present disclosure.

FIG. 17 is a schematic diagram of a device 1900 for accessing a wireless network according to an exemplary embodiment of the present disclosure. The device 1900 can be configured as a server. As shown in FIG. 17, the device 1900 includes a processing component 1922, which further includes one or more processors. The device 1900 includes memory resources represented by a memory 1932, which is configured to store instructions, e.g., application programs, executable by the processing component 1922. Application programs stored in the memory 1932 can include one or more modules, each module corresponding to a set of instructions. In some embodiments, the processing component 1922 is configured to execute instructions to perform the method for accessing a wireless network. The method includes receiving device verification information sent by a device to be connected with the wireless network via a target router. The method also includes performing a verification on the device according to the device verification information. The method further includes when the verification is successful, sending second access information to the device via the target router, such that the device can access the target router according to the second access information, and further access all of the one or more servers.

In an embodiment of the present disclosure, sending second access information to the device via the target router includes sending instructions to the target router to instruct the target router to send the second access information to the device.

In another embodiment of the present disclosure, sending second access information to the device via the target router includes sending the second access information to the target router, such that the second access information is sent to the device by the target router.

In an embodiment of the present disclosure, the device verification information includes a device identification and a verification key.

In an embodiment of the present disclosure, the second access information includes an identification and a password of a second wireless network. The second wireless network supports accessing all of the one or more servers.

The device 1900 further includes a power component 1926 configured to perform a power management for the device 1900, a wired or wireless network interface 1950 configured to connect the device 1900 to a network, and an input/output (I/O) interface 1958. The device 1900 can operate based on an operating system stored in the memory 1932, e.g., a Windows Server™, a Mac OS X™, a Unix™, a Linux™, a FreeBSD™, etc.

Figure 18:
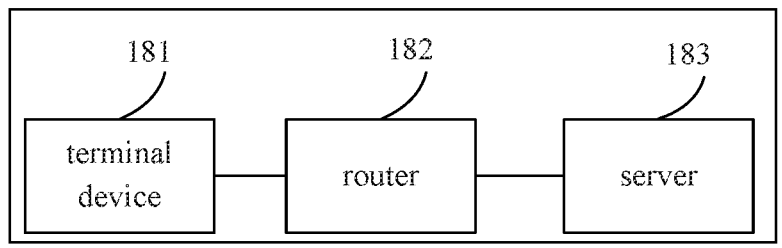
FIG. 18 is a block diagram of a system for accessing a wireless network according to an exemplary embodiment of the present disclosure.

FIG. 18 is a block diagram of a system for accessing a wireless network according to an exemplary embodiment of the present disclosure. As shown in FIG. 18, the system includes a terminal device 181, a router 182, and a server 183. The terminal device 181 is configured to perform the method provided in FIG. 2 or 3. The router 182 is configured to perform the method provided in FIG. 4 or 5. The server 183 is configured to perform the method provided in FIG. 6 or 7.

The terminal device 181 is configured to access the router according to first access information, so as to access a part of one or more servers. The terminal device 181 is configured to send device verification information to the part of one or more servers. The terminal device 181 is configured to receive second access information and access the target router according to the second access information, so as to access all of the one or more servers.

In an embodiment of the present disclosure, the terminal device 181 is configured to receive second access information sent by the router, the second access information being sent by the router according to an instruction from the server.

In another embodiment of the present disclosure, the terminal device 181 is configured to receive the second access information sent by the server.

In the present embodiments, the second access information can be sent by the server or the router, such that diversified demands are satisfied.

In an embodiment of the present disclosure, the device verification information includes a device identification and a verification key.

In an embodiment of the present disclosure, the first access information includes an identification of a first wireless network. Alternatively or additionally, the first access information includes the identification and a password of the first wireless network. The first wireless network supports accessing the part of one or more servers.

The second access information includes an identification and a password of a second wireless network. The second wireless network supports accessing all of the one or more servers.

The router 182 is configured to establish a first connection with the terminal device according to the first access information. The router 182 is also configured to receive the device verification information sent by the terminal device. The router 182 is further configured to send the device verification information to the part of one or more servers, and establish a second connection with the terminal device according to the second access information after the device verification information passes a verification performed by the part of one or more servers.

In an embodiment of the present disclosure, the router 182 is configured to receive an instruction sent by the server, the instruction being used to instruct a component (e.g., the router) to send the second access information to the terminal device. The router 182 is also configured to send the second access information to the terminal device.

In another embodiment of the present disclosure, the router 182 is configured to receive the second access information sent by the server, and send the second access information to the terminal device.

The server 183 is configured to receive the device verification information sent by the terminal device via the router; perform a verification on the terminal device according to the device verification information; and send the second access information to the terminal device via the router when the verification is successful.

In an embodiment of the present disclosure, the server 183 is configured to send an instruction to the router so as to instruct the router to send the second access information to the terminal device.

In another embodiment of the present embodiment, the server 183 is configured to send the second access information to the router, such that the second access information is sent to the terminal device via the router.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for accessing a wireless network, comprising:
accessing a target router according to first access information, so as to access a part of one or more servers;
sending device verification information to the part of one or more servers;
receiving second access information sent by the target router, wherein the second access information comprises an identification and a password of a wireless network for supporting accessing all of the one or more servers, and the second access information is sent by the target router according to an instruction sent from the part of one or more servers when the device verification information passes a verification performed by the part of one or more servers, the instruction being sent from the part of one or more servers to the target router for indicating to the target router that the device verification information passes the verification; and
accessing the target router according to the second access information, so as to access all of the one or more servers.

2. The method according to claim 1, wherein the device verification information comprises a device identification and a verification key.

3. The method according to claim 1, wherein, the first access information comprises an identification of a first wireless network, or the first access information comprises the identification and a password of the first wireless network, wherein the first wireless network supports accessing the part of one or more servers.

4. A terminal device, comprising:
a processor; and
a memory for storing instructions executable by the processor,
wherein the processor is configured to execute the instructions to:
access a target router according to first access information, so as to access a part of one or more servers;
send device verification information to the part of one or more servers; and
receive second access information sent by the target router, wherein the second access information comprises an identification and a password of a wireless network for supporting accessing all of the one or more servers, and the second access information is sent by the target router according to an instruction sent from the part of one or more servers when the device verification information passes a verification performed by the part of one or more servers, the instruction being sent from the part of one or more servers to the target router for indicating to the target router that the device verification information passes the verification; and
access the target router according to the second access information, so as to access all of the one or more servers.

5. The terminal device according to claim 4, wherein the device verification information comprises a device identification and a verification key.

6. The terminal device according to claim 4, wherein the first access information comprises an identification of a first wireless network, or the first access information comprises the identification and a password of the first wireless network, wherein the first wireless network supports accessing the part of one or more servers.

7. A system for accessing a wireless network, comprising:
a terminal device;
a router; and
a server, wherein,
the terminal device includes a processor and a memory for storing instructions executable by the processor, the processor being configured to execute the instructions to:
access the router according to first access information, so as to access the server as a part of one or more servers;
send device verification information to the part of the server;
receive second access information sent by the router, wherein the second access information comprises an identification and a password of a wireless network for supporting accessing all of the one or more servers; and
access the router according to the second access information, so as to access all of the one or more servers;
the router is configured to:
establish a first connection with the terminal device according to the first access information;
receive the device verification information sent by the terminal device;
send the device verification information to the server;
send the second access information to the terminal device according to an instruction for indicating to the router that the device verification information passes a verification; and
establish a second connection with the terminal device according to the second access information after the device verification information passes a verification performed by the server; and
the server is configured to:
receive the device verification information sent by the terminal device via the router;
perform the verification on the terminal device according to the device verification information; and
send the instruction for indicating to the router that the device verification information passes the verification to the router.

8. The system according to claim 7, wherein the device verification information comprises a device identification and a verification key.

9. The system according to claim 7, wherein the first access information comprises an identification of a first wireless network, or the first access information comprises the identification and a password of the first wireless network, wherein the first wireless network supports accessing the server.

* * * * *